United States Patent [19]
Woestman

[11] 3,824,005
[45] July 16, 1974

[54] APPARATUS FOR REFRACTING EYES
[75] Inventor: John W. Woestman, Havertown, Pa.
[73] Assignees: Joseph S. Zuritsky; Herman Zuritsky; Lee Zuritsky, all of Philadelphia, Pa. ; a part interest
[22] Filed: Mar. 28, 1973
[21] Appl. No.: 345,679

[52] U.S. Cl................. 351/8, 250/201, 250/225, 250/237 G, 351/13, 351/14, 356/126, 356/128
[51] Int. Cl......................... A61b 3/10, G01n 21/46
[58] Field of Search............. 351/6, 7, 8, 9, 14, 16, 351/13; 356/126, 128; 250/201, 225, 237 G

[56] References Cited
UNITED STATES PATENTS

| | | | |
|---|---|---|---|
| 2,012,758 | 8/1935 | Fincham | 351/16 X |
| 3,524,702 | 8/1970 | Bellows et al. | 351/16 X |
| 3,542,475 | 11/1970 | Cooper | 356/126 X |
| 3,572,909 | 3/1971 | Van Patten | 351/6 |
| 3,572,910 | 3/1971 | Koester | 351/16 X |

Primary Examiner—Paul A. Sacher
Attorney, Agent, or Firm—John W. Logan, Jr., Esq.

[57] ABSTRACT

Apparatus is provided to project a pattern of bars of light through a lens system into a subject's eye. The reflection of the pattern from the retina of the eye is passed back through the lens of the eye and through a second pattern system to a detector. The pattern of bars of light is continuously moved back and forth axially of the subject's eye to bring the pattern into focus on the retina once during its travel from one extreme to another. The second pattern system through which the reflected pattern passes is similar to the pattern of the bars of light in that it has a series of slots corresponding in size and position to the bars of light of the first pattern. This second pattern is vibrated sideways at a rapid speed to chop the pattern of light reflected from the retina so that a modulated light image which rises to a peak each time the pattern of bars of light is in focus on the retina of the subject's eye is supplied to the detector. The detector transmits an electric signal corresponding to the intensity of light received by it to electronic circuitry which determines the position of the primary pattern when it is in focus on the retina of the subject's eye and provides a readout in diopters indicating the refractive state of the subject's eye.

10 Claims, 5 Drawing Figures

PATENTED JUL 16 1974    3,824,005

APPARATUS FOR REFRACTING EYES

The present invention relates to new and useful improvements in apparatus for objectively refracting eyes.

A primary object of the present invention is to provide a novel refractometer which produces an accurate objective reading of the refractive state of a person's eyes to provide an indication of the optical correction required by the patient.

The further object of the present invention is to provide a novel refractometer which will transform reflected light from the retina of an eye into an electrical signal that reaches a peak which can be accurately read when an image is in focus on the retina of the eye.

A still further object of the present invention is to provide a novel refractometer including a system for measuring the change in intensity of light reflected from the retina in which extraneous reflections from the optical lenses and from portions of the eye than the retina are substantially eliminated.

Another object of the present invention is to provide a novel refractometer which will take light reflected from the retina of an eye and convert a relatively slow change in intensity of the reflected light to a series of sharp peaks with the peaks varying in intensity to permit a more accurate measurement of the time when the image is in focus on the retina.

Another object of the present invention is to provide a novel refractometer for use as a tool to permit an ophthalmologist to determine objectively the refractive state of a patient's eye, which refractometer is of relatively simple construction and may be easily manufactured and maintained.

These and other objects of the present invention and the various features and details of the operation and construction thereof are hereinafter more fully set forth and described with reference to the accompanying drawings in which.

Figure 1:
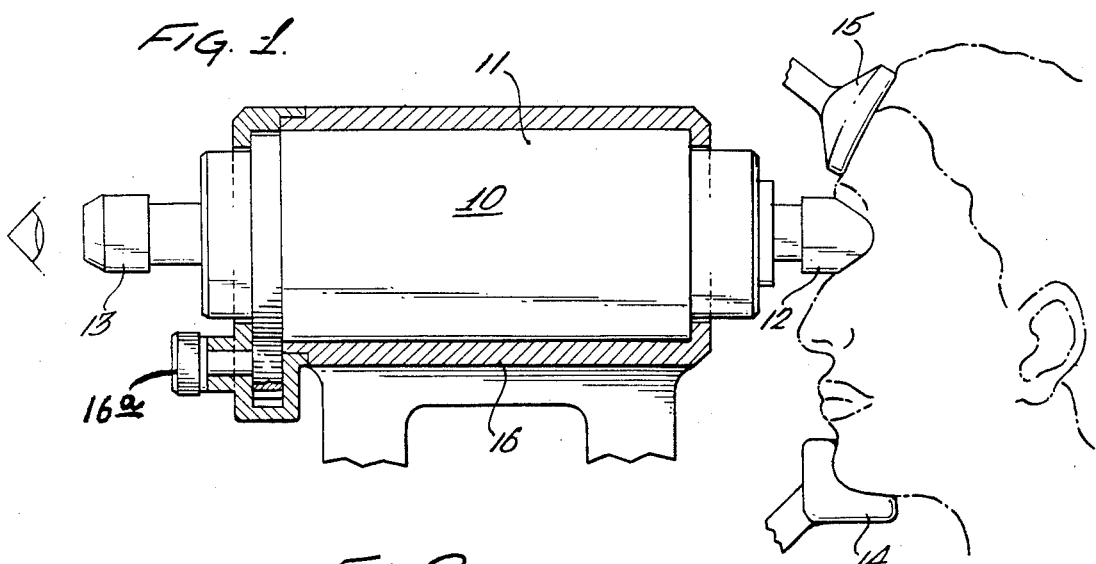
FIG. 1 is a side elevational view partially in section of the refractometer of the present invention in position to test an eye of a patient.

Referring more specifically to the drawings, there is illustrated in FIG. 1 a refractometer 10 made in accordance with the present invention which includes a housing 11 having at one end thereof an eye piece 12 for the eye of the patient being tested and at the opposite end thereof an eye piece 13 for use by the operator of the instrument. An adjustable chin rest 14 and an adjustable head rest 15 is provided to support the head of the patient and permit adjustment of the position of the patient's eye relative to the refractometer. The housing 11 is journalled within a support frame 16 for rotary adjustment about the axis of the eye piece 12, for example, by means of the adjusting knob 16a, as more fully described hereinafter.

In using the refractometer 10 of the present invention, the position of the instrument and/or the positions of the chin and head rests are adjusted by the operator to center the eye being tested adjacent the eye piece 12 with the optical axis of the eye coincident with the optical axis of the eye piece 12. These adjustments are made by the operator of the instrument who can view the position of the eye being tested through the eye piece 13.

Figure 2:
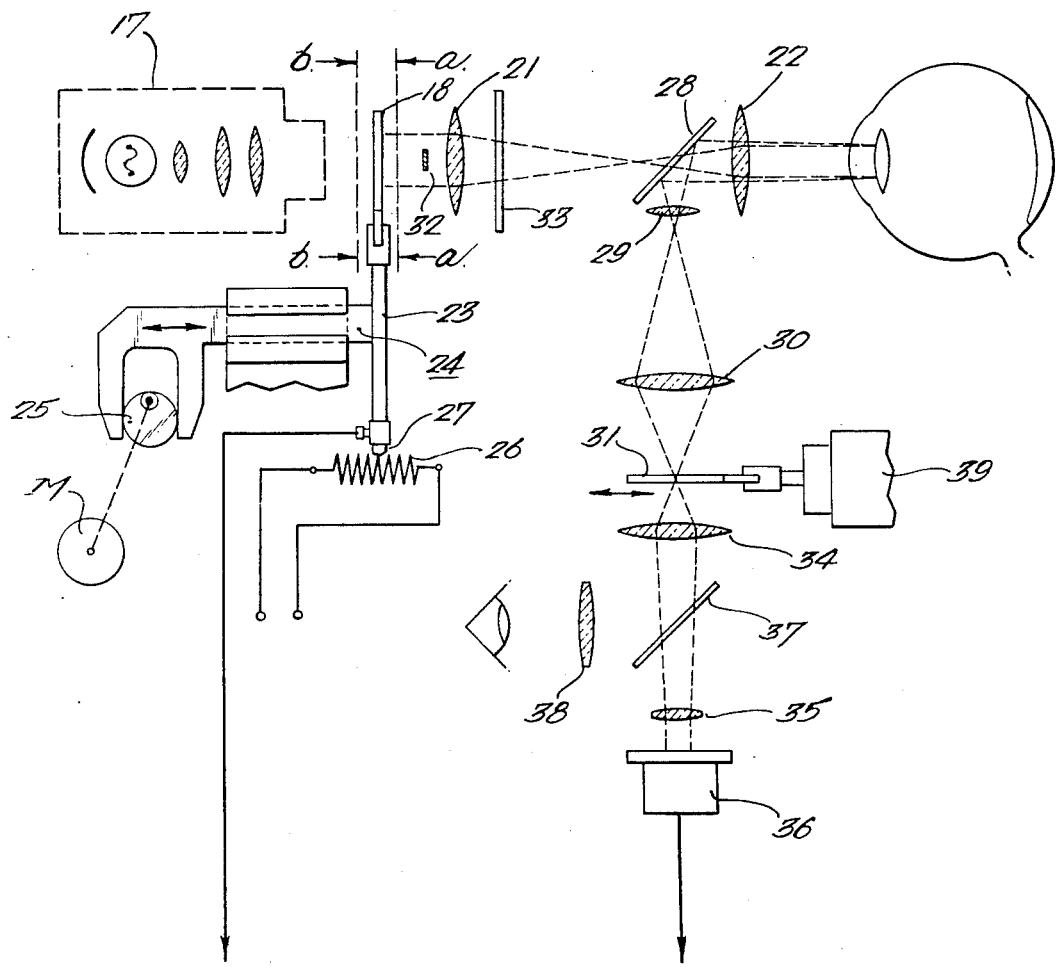
FIG. 2 is a schematic view of the optical system utilized in the refractometer of the present invention.
Figure 3:
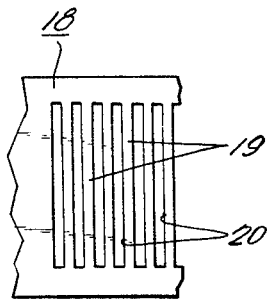
FIG. 3 is a front elevational view of the bar pattern projected into the eye under test.

FIG. 2 illustrates schematically the optical system for the refractometer of the present invention. A suitable light source 17 is provided which directs light toward an axially movable primary bar pattern 18 to form an image of a bar pattern which is utilized in determining the refractive state of the eye being tested. One satisfactory pattern 18 is illustrated in FIG. 3 and comprises a series of closely spaced bars and slots 19 and 20 respectively of equal width. The pattern may be formed, for example, by providing closely spaced opaque parallel lines in the range of approximately 65 lines per inch on a transparent surface with the thickness of the lines being equal to the spacing between adjacent lines. This provides an image which is directed through lenses 21 and 22 to the retina of the eye under test.

In accordance with the present invention, means is provided to move the bar pattern toward and away from the eye to permit the image of the bar pattern to be in focus on the retina of any eye regardless of its refractive state. Thus, the bar pattern is movable axially toward and away from the eye being tested from a central position as shown in FIG. 2 to opposite limit positions away from the center as indicated by the broken lines $a$ and $b$ in FIG. 2. When the bar pattern is in its central position the pattern is in focus on the retina of an emmetropic eye when the patient's eye is relaxed and the patient is staring at infinity. Similarly, when the bar pattern is moved closer to the eye toward the point $a$, this pattern will be in focus on the retina of a myopic eye and conversely when the pattern is moved rewardly away from the eye toward the line $b$, the pattern will be in focus on the retina of a hyperopic eye. Accordingly, for any one eye, there is one position of the bar pattern where the pattern is focused properly on the retina of the eye.

To permit proper movement of the bar pattern, the bar pattern is supported by a frame 23 that is carried by an axially movable guide rod 24 which in turn is in engagement with a continuously rotating motor drive cam 25. The cam is caused to rotate two revolutions per second so that the bar pattern 18 is moved back and forth at the rate of two cycles per second.

To provide a signal responsive to the position of the primary bar pattern, a resistance coil of a linear potentiometer 26 is positioned beneath the guide rod 24 and the guide rod 24 is interconnected with the central contact 27 of the potentiometer to cause the contact to move back and forth along the coil of the potentiometer in unison with movement of the bar pattern 18. The linear potentiometer provides a continuously varying DC output signal which varies directly with the position of the bar pattern. This output signal is utilized as an input to an electronic circuit, more fully described hereinafter, to indicate the linear position of the bar pattern at any selected time.

The image of the primary bar pattern which is directed into the eye by the lenses 21 and 22 is reflected back from the retina through the lens of the eye and the lens 22 to a beam splitter 28 which then directs this reflected image downwardly through the lenses 29 and 30 to a secondary bar pattern 31. A small portion, usually in the neighborhood of 10 percent or less, of the light directed onto the retina is reflected back from the retina through this series of lenses. Thus, it is important to control and eliminate from the lens system any reflected light, such as by light reflected off of the center of the lenses which are normal to the optical axes of the lens system and light reflected from the cornea of the eye being tested. To eliminate this undesired reflected light, an anti-reflection spot 32 is provided on the optical axis of the lens system between the first lens 21 and the primary bar pattern 18. This eliminates light along the central axis of the lenses 21 and 22 and thus prevents the reflection of light from the center of the lenses. In addition, a quarter wave length polarizer 33 is provided between the first lens 21 and the beam splitter 28 which polarizes the light in the vertical direction relative to FIG. 2. The light reflected from the cornea of the eye being tested in specular or still polarized and will not be reflected from the beam splitter 28 downward toward the lenses 29 and 30. The light reflected from the retina is not polarized and will be reflected downwardly by the beam splitter 28. Thus, only the retinal reflection is reflected from the beam splitter downwardly through the lenses 29 and 30 to the secondary bar pattern 31.

Reflected light which passes through the secondary bar pattern 31, more fully described hereinafter, is directed through lenses 34 and 35 to the cell of a photodetector 36. The photodetector 36 in turn transmits an electrical signal whose strength is directly proportional to the quantity of light directed onto the cell, which signal is used as an input to the electronic circuitry that provides an indication of the reflective state of the eye being tested, as more fully described hereinafter. Interposed between the lenses 34 and 35 is a beam splitter 37 which directs a portion of the reflected light toward the lens 38. The lens 38 is positioned within the operator's eye piece 13 for the instrument so that the operator may observe the patient's eye during initial adjustment of the instrument and if desired, during testing of the eye.

In accordance with the present invention, the secondary bar pattern 31 is identical to the primary bar pattern 18 with the bars of the pattern lying in a direction parallel to the reflection of the bars of the primary bar pattern. A vibrator 39 is provided to move or vibrate the secondary bar pattern within the plane of the pattern in a direction transverse to the direction of the bars in the secondary bar pattern a distance exactly equal to the width of the bars of the pattern. The vibrator 39 will vibrate the secondary bar pattern at a rapid rate of speed, for example, at 100 cycles per second. In one extreme position of the secondary bar pattern, the open slots between the bars coincide exactly with the position of the strips of light of the primary bar pattern and reflected from the retina of the eye being tested so that the maximum quantity of light passes through the secondary bar pattern. In the other extreme position of the secondary bar pattern, the bars will coincide exactly with the strips of light of the primary bar pattern reflected from the retina of the eye under test so that no light is transmitted through the secondary bar pattern. Thus, the secondary bar pattern transmits through the lenses 34 and 35 to the photodetector 36 a light pattern which varies from a maximum to a minimum along a sine wave pattern with the frequency of the transmitted pattern varying at the rate of 100 cycles per second.

The intensity of the light reflected from the eye under test to the secondary bar pattern will vary at the rate of 2 cycles per second due to the axial movement of the primary bar pattern 18. This transmitted light will be at a maximum when the primary bar pattern is in a position where the light passing through the primary bar pattern is in focus on the retina of the eye being tested and will be at a maximum when the position of the primary bar pattern is such that the focal point of the light passing through the moving primary bar pattern is at the farthest point it reaches away from the surface of the retina.

The result of the combination of the primary and secondary bar patterns and the movement of these bar patterns is such that the light directed onto the cell of the photodetector varies in a sine wave pattern at the rate of 100 cycles per second with the peaks of the 100 cycle sine wave changing in amplitude within a 2-cycle per second sine wave envelope. When the light from the primary bar pattern is in best focus on the retina of the eye being tested, the amplitude of the individual peak in the 100 cycle per second transmission of light through the secondary bar pattern will be at its maximum. Thus, a measurement of the position of the axially moving primary bar pattern at the instant the amplitude of the 100 cycle pattern of light transmitted through the second bar pattern is at its maximum will provide an indication of the refractive state of the eye under test.

Figure 4:
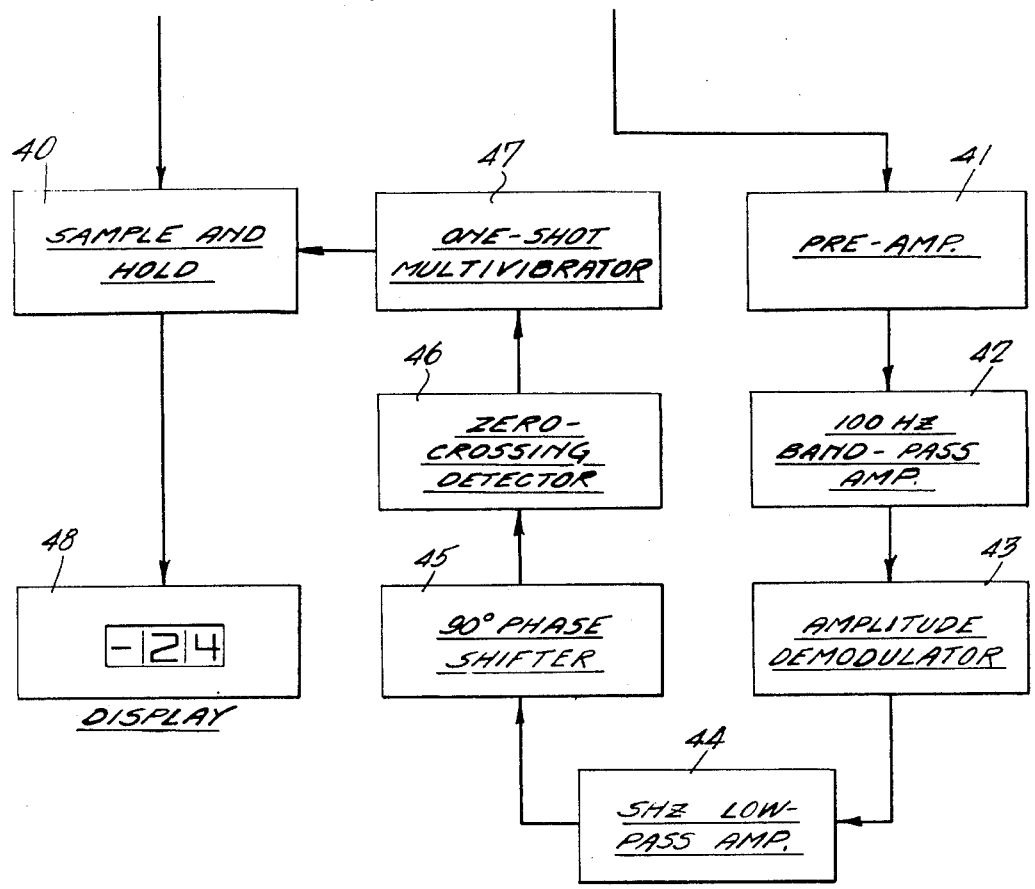
FIG. 4 is a block diagram of the electric circuit which receives signals from the refractometer and translates the signals into an output indicative of the refractive state of the eye being tested.

FIG. 4 is a block diagram of the electrical circuitry which receives signals from the refractometer of the present invention and translates the signal into an output indicative of the refractive state of the eye being tested. Two signals are continuously supplied to this circuit. The first signal is from the position indicating potentiometer 26 which is a linear D.C. signal which modulates from a minimum to the maximum at the rate of two cycles per second and is directly indicative of the position of the primary bar pattern, as previously described. This signal is supplied to the sample and hold circuit 40. The second signal supplied to this circuitry is the output voltage from the photodetector which is at the microvolt level and varies at the rate of 100 cycles per second with the amplitude of the 100 cycle signal varying at the rate of two cycles per second.

This signal is supplied to the preamplifier circuit 41 which amplifies the signal from the photodetector to a useful level.

From the preamplifier, the amplified signal received from the photodetector passes through a 100 cycle band-pass amplifier 42. This band-pass amplifier will permit the passage of signals in the range of 95 to 105 cycles to be passed through to the rest of the circuitry and will block out all other signals. Thus, the light source can be operated on the normal 60 cycle circuit and the 60 cycle effect of the light source will be blocked out by the band-pass amplifier as well as all other spurious signals which might be present in the system other than those in the range of the band-pass amplifier.

Figure 5:
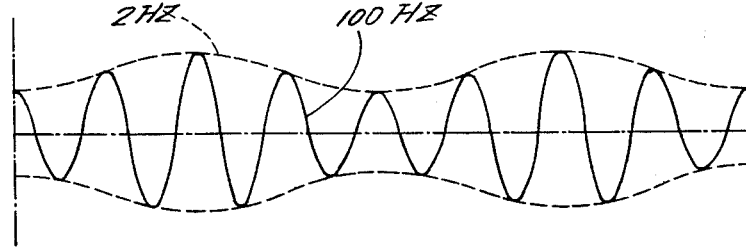
FIG. 5 is a wave pattern of the signal transmitted by the photodetector to the electric circuit.

The signal which passes through the band-pass amplifier is then supplied to an amplitude demodulator circuit 43. FIG. 5 is a diagrammatic representation of the signal received by the amplitude demodulator. As shown in FIG. 5, there is the 100 cycle signal in the form of a sine wave as shown in full lines in FIG. 5 wich varies in amplitude within the two cycle envelope as shown in dotted lines in FIG. 5. The amplitude demodulator cuts this signal in half at the midpoint of the modulation of the 100 cycle signal along the dot and dash line in FIG. 5 and provides as an output only that portion of the 100 cycle signal above the dot and dash line.

The signal from the amplitude demodulator is then passes through a five cycle per second low pass amplifier 44 which functions to filter out from the signal all cycles above five cycles per second. Thus, this low pass amplifier 44 will block further transmission to the circuit of the 100 cycle constantly varying signal and will pass through solely the upper half of the two cycle envelope of the 100 cycle signal supplied by the photodetector. Thus, the signal leaving the low pass amplifier 44 is in the form of a two cycle relatively shallow sine wave. As described previously, this two cycle sine wave will be at its maximum intensity when the axially moving, primary bar pattern is at a position where the light pattern is in focus on the retina of the eye being tested so that a maximum quantity of light is reflected back through the lens of the eye from the retina to the photodetector. Thus, if a measurement is made at the time this two cycle signal is at its maximum of the position of the axially moving primary bar pattern, the position of the axially moving primary bar pattern will be indicative of the refractive state of the eye being tested.

Because of the fact that the two cycle signals leaving the low pass amplifier is in the form of a sine wave of relatively shallow amplitude, a measurement of the time at which it is at its maximum is difficult. Accordingly, this two cycle signal from the low pass amplifier is caused to pass through the 90° phase shifter circuit 45 which shifts the phase of the two cycle signal 90°. This 90° shifted signal is then caused to pass through a zero crossing detector circuit 46 which determines the time at which the signal passes zero. This zero crossing detector is an accurate representation of the time at which the signal transmitted from the low pass amplifier is at its maximum. When the zero crossing detector indicates a zero point in the circuit, it transmits a pulse to the one-shot multivibrator 47 with one pulse being transmitted to the one-shot multivibrator each time the two cycle wave form goes through zero. The action of the zero-crossing detector is such that a positive output pulse is generated when the zero crossing occurs for an increasing voltage (positive slope) and a negative output pulse is generated when the zero crossing occurs for a decreasing voltage (negative slope). The one-shot multivibrator is activated only by the positive pulse. Thus, the one-shot multivibrator is activated twice a second by the positive output pulses of the zerocrossing detector which occur at the positive peaks of the 2-cycle per second voltage waveform (before its 90° phase shift) with each pulse coinciding with the time the image of the axially moving primary bar pattern is in focus on the retina of the eye being tested. The one-shot multivibrator 47 in turn transmits a signal to the sample and hold circuit 40 each time the oneshot multivibrator receives a positive impulse from the zero crossing detector 46.

As set forth previously the sample and hold circuit 40 has as its input a D.C. signal which varies directly with the position of the axially moving primary bar pattern. This signal is provided by the linear potentiometer 26 which is caused to move along with movement of the primary bar pattern with the input signal being zero when the primary bar pattern is in its central position. This signal varies in a straight line relationship with the movement or position of the primary bar pattern. The sample and hold circuit constantly samples the D.C. voltage signal transmitted to it, and upon receipt of a signal from the one-shot multivibrator a gate in the sample and hold circuit is opened causing the sample and hold circuit to hold and read the voltage it was sampling at the time it received the signal from the one-shot multivibrator.

This signal held by the sample and hold circuit is then transmitted to the display circuit 48. The signal received by the display circuit 48 during the course of testing an eye would be a constant D.C. voltage interrupted for a few microseconds every half second with the interruptions being caused by the impulses transmitted by the one-shot multivibrator. The display circuit 48 translates this D.C. signal to a numeric reading indicative of the refractive state of the eye being tested. If the eye being tested is an emetropic eye, the numerical reading of the display circuit will be zero indicating for the position of the refractometer at the time of the test that zero correction is needed for the eye. If the eye is not emetropic, the reading will be in plus or minus diopters depending on whether the eye is hyperopic or myopic.

To use the instrument of the present invention the operator using the eye piece 13 will adjust the position of the subject's eye relative to the instrument, for example, by adjusting the chin rest 14 and head rest 15 so that the subject's eye appears centered in the eye piece 12. In this position the axis of the subject's eye will be coincidental with or close to the axis of the lenses 21 and 22. The subject is directed to look at an object at virtual infinity with both eyes open even though the instrument is, in effect, partially blocking the view from the eye being measured. With the instrument turned on, the operator will read and record the refraction of the eye being tested on the numeric display 48. The operator will repeat this procedure with the same eye, rotating the instrument in step by step increments until the instrument is rotated 90°, recording the numeric display at the end of each step of rotation. This same procedure will then be followed for the other eye. The readings provided by the numeric display for the entire series of steps of rotation of the instrument may be used by the ophthalmologist or technician performing the tests to determine the spherical and cylindrical correction required to correct the vision of the eye being tested and also to determine the axis of any astigmatism which might exist in the eye.

From the foregoing, it will be seen that the present invention provides a novel refractometer which produces an objective reading of the refractive state of a person's eye to provide an indication of the optical correction required by the patient.

While a particular embodiment of the present invention has been illustrated and described herein, it is not intended to limit the invention to such a disclosure and changes and modifications may be incorporated therein within the scope of the following claims.

I claim:

1. A refractometer for the objective determination of the refractive state of a subject's eye, comprising:

image forming means to form an image of a light pattern and project said image into the subject's eye and to the retina of the eye, means to uniformly vary the position of said image forming means back and forth along the optical axis of the subject's eye at a regular frequency from a central position in which the image is in focus on the retina of an emetropic eye to opposite limit positions at opposite sides of said central position with the image in focus on the retina of a hyperopic eye during movement to one limit position and in focus on the retina of a myopic eye during movement to the other limit position, a detector for determining the intensity of light received by it, said detector operable to transmit a signal varying in strength in proportion to the intensity of light received by it, means to direct at least a portion of the light pattern of said image reflected from the retina of the subject's eye to said detector, means positioned along the path of travel of the reflected light between the eye and the detector to rapidly interrupt the reflected light at substantially shorter intervals than the frequency of movement of the image forming means to provide to the detector a series of peaks of light with the peaks varying with the intensity of the reflected light, and means to determine the position of the image forming means at the same time the intensity of the light reflected from the retina of the eye and the peaks of light received by the detector are a maximum.

2. Apparatus in accordance with claim 1 in which the image is a pattern of bars of light of predetermined length and width with the spacing between adjacent bars of light equal to the width of the bars of light.

3. Apparatus in accordance with claim 2, in which the means along the passage of reflected light intermediate the eye and the detector to rapidly interrupt the light comprises a movable patterned grid lying in a plane normal to the direction of the path of travel of the reflected light with the grid having a series of slots therein equal in number and length and width and spacing to the pattern of bars of light in said image.

4. Apparatus in accordance with claim 3 including means to move said patterned grid within said plane normal to the direction of travel of said reflected light and in a direction at right angles to the long axis of said slots, said means to move said patterned grid operable to move the grip equal to the width of the slots between a first position in which the pattern of bars of light coincide with said slots to a second position in which the bars of light of said pattern lie between said slots.

5. Apparatus in accordance with claim 1 including a quarter wave length polarizer positioned between said image forming means and the eye to polarize the light of said image in a predetermined direction, and a beam splitter positioned intermediate the polarizer and the eye to receive light reflected back from the eye and direct polarized light reflected from the retina toward the detector.

6. Apparatus in accordance with claim 1 including means responsive to the position of said image forming means to transmit a first electric signal whose voltage varies with the position of said image forming means, and in which said detector transmits a second electric signal whose voltage varies with the intensity of light received by said detector, the voltage of said second electric signal being at a maximum when the intensity of light received by the detector is at a maximum.

7. Apparatus in accordance with claim 6 including electronic circuitry to receive said first and said second electric signals, said circuitry operable to provide an indication of the position of said image forming means along its path of travel between its opposite limit positions at the time the voltage of said second electric signal is at its maximum.

8. Apparatus in accordance with claim 7 in which said electronic circuitry amplifies said second electric signal received by it from said detector, converts said amplified signal to a wave form following the change of intensity of light reflected from the retina, shifts the phase of said wave form 90°, determines when said shifted wave form passes through its zero point, and transmits a predetermined signal each time said shifted wave form passes through its zero point indicating maximum intensity of the reflected light.

9. Apparatus in accordance with claim 8 in which said electronic circuitry includes means to constantly sample the voltage of said first electric signal and hold the sampled voltage upon receipt of said predetermined signal.

10. Apparatus in accordance with claim 9 in which said electronic circuitry includes display means to provide a visual display of the sample of said voltage held upon receipt of said predetermined signal, said display means operable to convert said sampled and held voltage to a visual reading indicating the refractive state of the subject's eye.

* * * * *